United States Patent [19]

Nomura et al.

[11] Patent Number: 4,672,173

[45] Date of Patent: Jun. 9, 1987

[54] GAS-SHIELDED ARC WELDING APPARATUS

[75] Inventors: Hirokazu Nomura; Yukihiko Sato, both of Tsu; Eiji Morishige; Yasuhiko Nishi, both of Hisai; Mizuho Higurashi, Tokyo; Saburo Mori, Yokohama, all of Japan

[73] Assignees: Nippon Kokan Kabushiki Kaisha, Tokyo; Nippon Kokan Koji Kabushiki Kaisha, Yokohama, both of Japan

[21] Appl. No.: 828,336

[22] Filed: Feb. 11, 1986

[30] Foreign Application Priority Data

Feb. 28, 1985 [JP] Japan .................................. 60-37570
Feb. 28, 1985 [JP] Japan .................................. 60-37571

[51] Int. Cl.$^4$ .............................................. B23K 9/225
[52] U.S. Cl. ..................................... 219/125.1; 219/74
[58] Field of Search ...................... 219/53, 54, 72, 74, 219/73.1, 125.1

[56] References Cited

U.S. PATENT DOCUMENTS 2,336,283 12/1943 Neill ...................................... 219/74
2,945,943 7/1960 Meyer ................................... 219/74
2,950,378 8/1960 Tuthill .................................. 219/74

FOREIGN PATENT DOCUMENTS 45-14173 5/1970 Japan ..................................... 219/72

Primary Examiner—Clifford C. Shaw
Attorney, Agent, or Firm—Fleit, Jacobson, Cohn & Price

[57] ABSTRACT

A gas-shielded arc welding apparatus automatically welds materials to be welded, such as rails or shape steel. The apparatus includes a gas-shielded chamber and a pair of side backing plates arranged within the chamber whereby the whole weld zone of the materials is gas shielded and a welding nozzle and shielding gas outlets are separated from each other. The apparatus also includes a welding apparatus proper and a control unit thereby performing the welding in a fully automatic manner.

9 Claims, 7 Drawing Figures

GAS-SHIELDED ARC WELDING APPARATUS

BACKGROUND OF THE INVENTION

The present invention relates to a gas-shielded arc welding apparatus for rails, shape steel, etc., and more particularly to its gas shield structure and the automatic and high-quality welding of rails and the like.

In conventional gas-shielded arc welding apparatus of this type, the gas shield structures are so designed that the forward end of a welding nozzle is covered with a tubular shielding gas jet or shielding gas jets are provided at either side or each side of a long and slender welding nozzle.

The former is inefficient since the welding torch is increased in diameter and the groove width must be increased in the case of multi-layer welding of thick plates. Also, while the latter can attain the flattening of the portion comprising the welding nozzle and the shielding gas jets and hence decrease the groove width, it is not suitable, due to the impedimental effect of its gas jets, for such welding processes as the electrogas welding in which the weld zone is enclosed by backing plates. Moreover, the two gas shielding structures are disadvantageous in that each of them provides a localized shielding of the welding arc and the molten metal thus causing the danger of entraining the outside air and tending to cause welding defects such as blow holes.

Also, the automatic welding of rails by the conventional arc welding methods has been difficult due to the complicated cross-sectional shapes of the rails and the rails have been generally welded manually by the enclosed arc welding process. In the enclosed arc welding process, the base portions of rail ends opposed through a gap of about 17 mm and the rail sides are enclosed with copper blocks and the rails are welded manually in the flat position by using a covered arc welding electrode of the low hydrogen type.

The above-mentioned enclosed arc welding process is disadvantageous in that due to the manual welding, the good or bad of welding quality is dependent on the skill of the operator and the weld time is comparatively long thus binding the operator to the work during the welding operation.

SUMMARY OF THE INVENTION

It is an object of the present invention to provide gas-shielded arc welding apparatus capable of providing a gas shield to the whole weld zone of materials to be welded.

It is another object of the invention to provide a gas-shielded arc welding apparatus so constructed that a welding nozzle and shielding gas outlets are completely separated from each other.

It is still another object of the invention to provide a gas-shielded arc welding apparatus capable of performing the welding of materials to be welded continuously in a full automatic manner.

It is still another object of the invention to provide a gas-shielded arc welding apparatus capable of stably producing a high-quality joint through the automatic management and control of the welding conditions.

It is still another object of the invention to provide a gas shielded arc welding apparatus which accomplishes the full-automatic high-efficiency welding of rails.

In accordance with one aspect of the invention, the gas-shielded arc welding apparatus includes a welding chamber and the welding chamber includes a chamber arranged to enclose the whole weld zone, including therein a plurality of shielding gas outlets and adapted to admit the insertion of a welding nozzle thereinto and a pair of side backing plates or blocks movably arranged on the sides of the materials to be welded within the chamber.

In a preferred form of the gas-shielded arc welding apparatus according to the invention, the shielding gas outlets are in the form of a plurality of side gas outlets provided in each of the pair of side backing plates so as to project a shielding gas supplied from outside of the chamber against the materials to be welded and a cooling water is circulated within the side backing plates. The side backing plates are each provided with a surface shape corresponding to the side shape of the materials to be welded and the side backing plates are used when effecting the electrogas welding.

In the gas-shielded arc welding apparatus according to the invention, the whole weld zone is gas shielded by the shielding gas projected through the shielding gas outlets provided within the chamber. During the electrogas welding of materials to be welded, e.g., the webs and heads of rails or shape steel, the pair of side backing plates are moved so as to enclose the weld zone.

With the gas-shielded arc welding apparatus including the above-mentioned welding chamber, the whole weld zone is gas shielded and the shielding effect is increased thus making it possible to effect the gas-shielded arc welding even in any outdoor place where the wind is high, for example. Further, the diameter of the welding torch is reduced by virtue of the construction in which the welding nozzle and the shielding gas outlets are completely separated from each other. Still further, the groove width is only required to have a gap sufficient to permit the insertion of the small-diameter nozzle and this makes it possible to effect the electrogas arc welding of such thin portions as the rail webs with a square groove having a groove width of 12 m. Of course, this equally applies to the welding of shape steel in addition to the rails.

In accordance with another aspect of the invention, the gas-shielded arc welding apparatus includes in addition to the welding chamber, a welding apparatus proper and a control unit for controlling the welding chamber and the welding apparatus proper.

The welding apparatus proper includes a welding torch unit including an elongated welding nozzle, a welding wire feeding mechanism for supplying a welding wire to the welding torch unit, an XY drive unit for moving the welding torch unit in the horizontal and vertical directions and a clamping mechanism for fastening the welding apparatus proper to materials to be welded or rails.

The control unit includes welding area detecting means for detecting the welding area of materials to be welded, e.g., rails, a memory for storing welding processes and welding conditions corresponding to the shape and welding areas of the rails, an information processing unit for selectively outputting the welding processes and the welding conditions stored in the memory in response to the output of the welding area detecting means and a drive control unit for applying a control signal to each of drive means. The drive control unit includes input means for receiving information from the sensors of the drive means, computing means for comparing the information from the information processing unit and the input means and drive output means for applying the result of the comparison to the drive means.

The control unit is responsive to the welding area information from the welding area detecting means to perform control operations such that a root pass is provided by the one-side penetration bead welding, the rail bases are welded by the ordinary gas-shielded arc welding and the rail webs and heads are welded by the electrogas arc welding.

In accordance with the apparatus of the invention including the above-mentioned welding chamber, welding apparatus proper and control unit, the weld zone is shielded from the outside air by the welding chamber and the welding conditions of materials to be welded, e.g., rails are controlled in accordance with their shape thereby effecting a narrow-groove welding by the gas-shielded arc welding process in a full automatic manner.

Thus, in accordance with the present invention the welding of rails is effected continuously in a full automatic manner making it possible to perform a high-quality welding with a high degree of efficiency without being affected by the skill of the operator and thereby contributing greatly toward the saving of labor in the welding of rails.

Other objects and advantages of the invention will be apparent from the following description, the appending claims and accompanying drawings.

DESCRIPTION OF THE PREFERRED EMBODIMENTS

Figure 1:
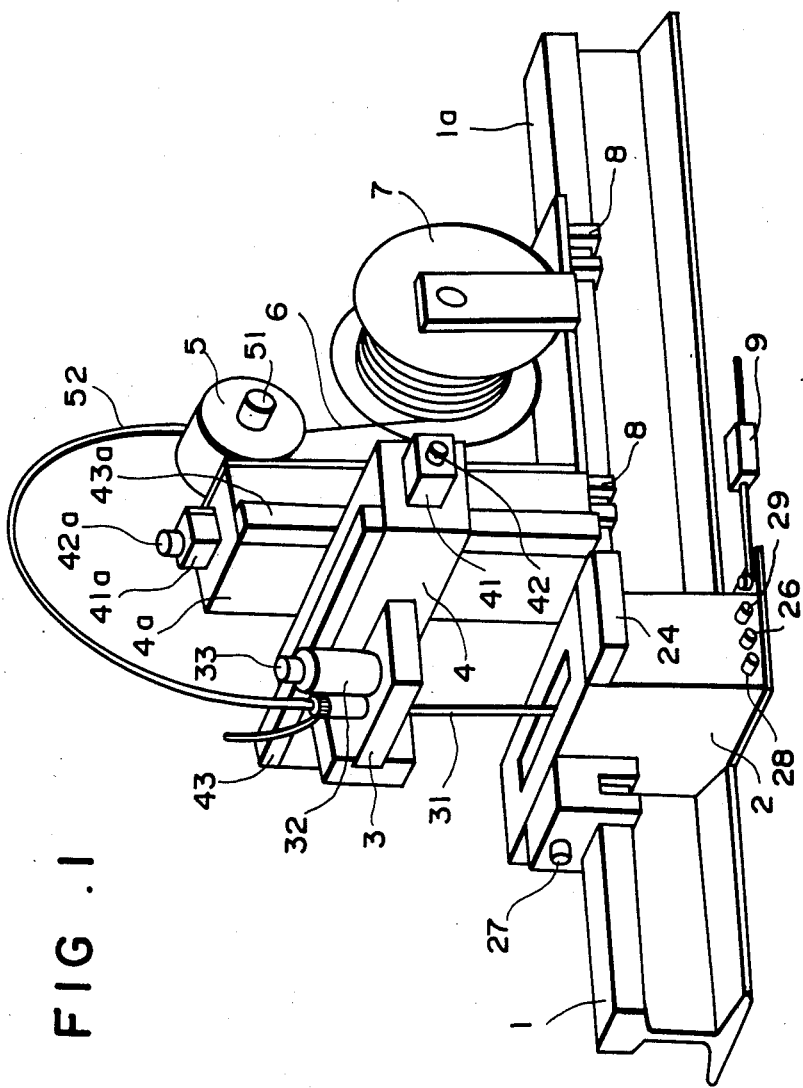
FIG. 1 is a perspective view showing an embodiment of the invention.

Referring to the perspective view of FIG. 1, rails 1 and 1a, materials to be welded, are welded at their ends within a welding chamber 2. A welding torch unit 3 is arranged above the chamber 2. An X-drive block 4 and a Y-drive block 4a respectively control the movement of the welding torch unit 3 in the horizontal and vertical directions. A welding wire feed motor 5 supplies a welding wire 6 to the welding torch unit 3 and the welding wire 6 is wound on a wire reel 7. A clamping mechanism 8 fastens the welding apparatus proper to the rails 1 and 1a and a welding current sensor 9 detects the welding current to effect the desired control in accordance with the detected value.

Figure 2:
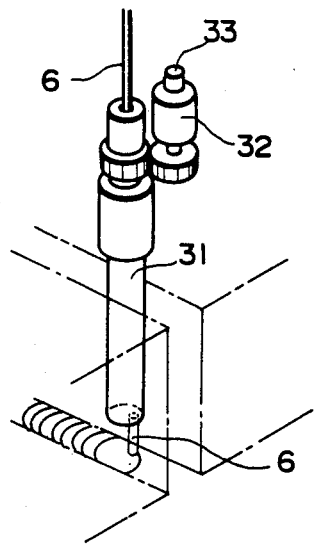
FIG. 2 is a perspective view of the welding torch unit.

The welding torch unit 3 includes a small-diameter long welding nozzle 31, a nozzle turning motor 32 and a nozzle rotation speed detecting sensor 33 and a feed opening for the welding wire 6 is made eccentric at the forward end of the welding nozzle 31 as shown in FIG. 2 so that the turning of the welding nozzle 31 by the nozzle turning motor 32 ensures the desired penetration to the inner sides of the groove.

The X-drive block 4 and the Y-drive block 4a for moving the welding torch unit 3 respectively include X- and Y-drive motors 41 and 41a, X- and Y-drive speed sensors 42 and 42a and X- and Y-position sensors 43 and 43a.

The welding wire feed motor 5 includes a wire feed rate sensor 51 and it supplies the welding wire 6 to the welding torch unit 3 through a pipe 52.

Figure 3:
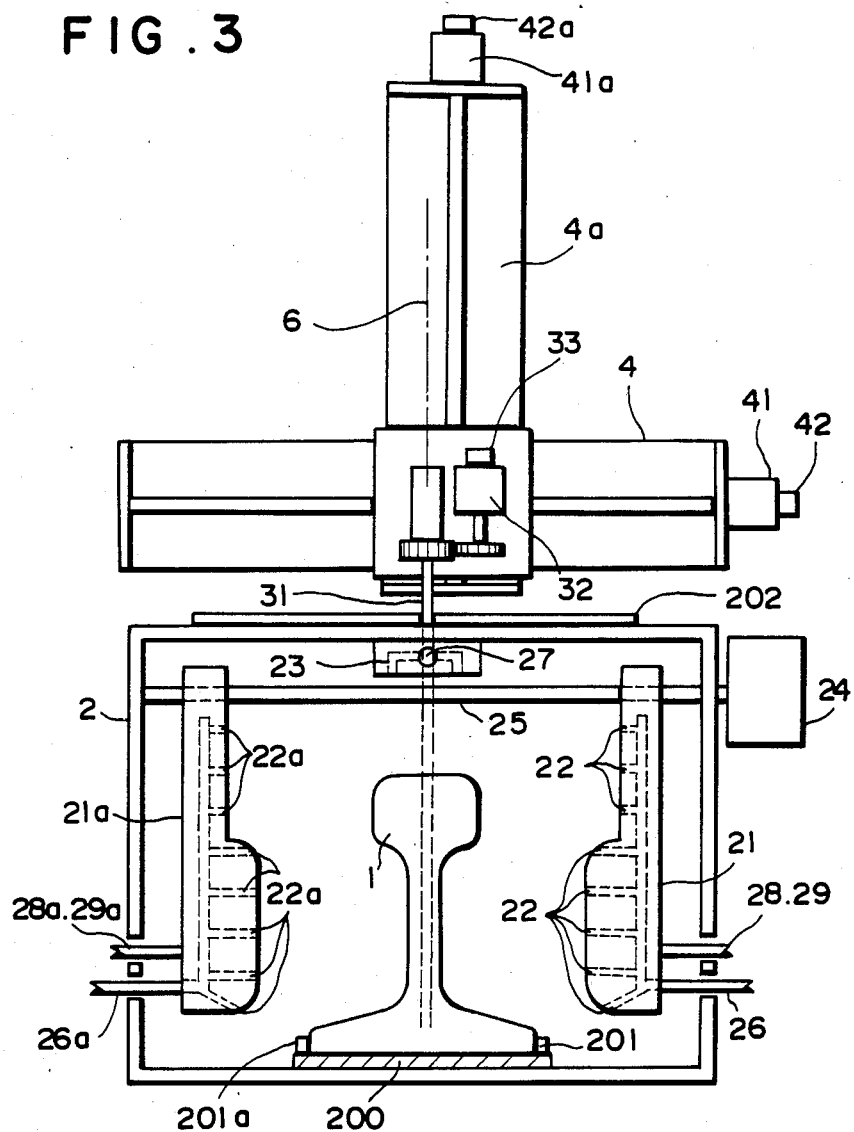
FIG. 3 is a side sectional view of the welding chamber.

The welding chamber 2 is provided to shield the weld zone of the rails 1 and 1a from the outside air and produce a high-quality joint and it contains, as shown in FIG. 3, a pair of movable water-cooled side backing blocks or plates 21 and 21a, shielding gas side outlets 22 and 22a provided in the side backing plates 21 and 21a, respectively, and top outlets 23 for projecting the shielding gas to the heads of the rails 1 and 1a from above.

A side backing plate drive motor 24 rotates a side backing plate driving shaft 25 so that the rotation of the shaft 25 moves the pair of movable water-cooled side backing plates 21 and 21a so as to enclose the weld zone of the rails 1 and 1a. Gas inlets 26 and 26a are respectively provided to supply the shielding gas to the side outlets 22 and 22a and a gas inlet 27 is provided to supply the shielding gas to the gas outlets 23. The shielding gas is supplied to the gas inlets 26, 26a and 27 so that the shielding gas is projected from the side outlets 22 and 22a and the top outlets 23 and the interior of the welding chamber 2 is shielded by the gas.

Cooling water inlets 28 and 28a are respectively provided to supply cooling water to the movable water-cooled side backing plates 21 and 21a and the cooling water is discharged through cooling water outlets 29 and 29a thereby cooling the side backing plates 21 and 21a. A backing strip 200 and tabs 201 and 201a are arranged at the inner bottom of the welding chamber 2. Also, an insulating plate 202 is provided on the upper surface of the welding chamber 2 and the welding nozzle 31 is inserted into the chamber 2 through an opening formed in the insulating plate 202. The insulating plate 202 is adapted to slide laterally along with the movement of the welding nozzle 31.

Figure 4:
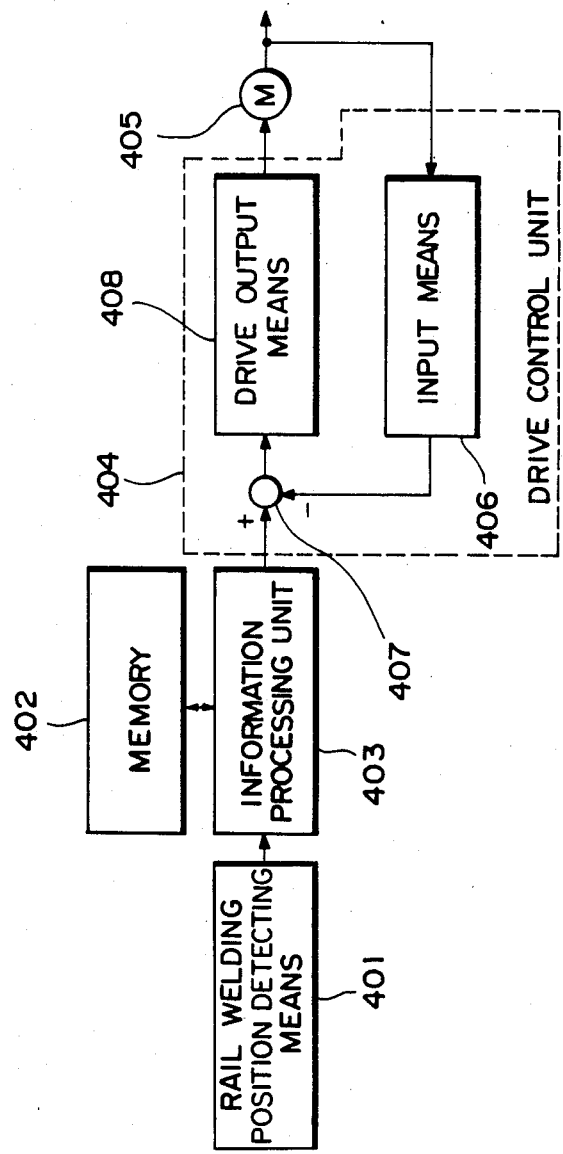
FIG. 4 is block diagram of the control unit.

FIG. 4 is a block diagram showing the control unit in the present embodiment and in the Figure rail welding area detecting means 401 comprises the Y-position sensor 43a so that the amount of upward movement of the Y-drive block 4a rising along with the progress of the welding is detected by the Y-position sensor 43a to determine the height of welding and thereby determine and output the welding area of the rails. A memory 402 stores the welding processes and welding conditions corresponding to the shape and respective parts of the rails. An information processing unit 403 receives an input signal from the rail welding area detecting means 401 to select and determine the welding process and welding conditions corresponding to the welding area of the rails from the contents stored in the memory 402. A drive control unit 404 is provided to control the operation of drive motors 405 for the respective drive means of the welding apparatus and it includes input means 406 for receiving the information from the sensors of the drive means, computing means 407 for performing the operation of comparison on the information from the information processing unit 403 and the input means 406 and drive output means 408 for applying the results of the comparison by the computing means 407 to the drive motor 405.

In accordance with the feedback control of the drive control unit 404, the nozzle rotation speed control, the wire feed rate control, the X-drive block displacement control, the X-drive block travel speed control and the welding current control are effected. In other words, the nozzle rotation speed control is feedback controlled by detecting the rotation speed of the nozzle turning motor 32 by the nozzle rotation speed sensor 33. Also, the feedback control for the wire feed rate control is effected by detecting the rotation speed of the welding wire feed motor 5 by the wire feed rate sensor 51 and the feedback control for the displacement control and the travel speed control of the X-drive block are effected by detecting the position and rotation speed of the X-drive motor 41 by the X-position sensor 43 and the travel speed sensor 42, respectively. Also, utilizing the fact that the welding current value changes with a change in the wire extension, the welding current is controlled by detecting the current value by the welding current sensor 9, comparing it with the desired value and operating the Y-drive motor 41a thus vertically moving the Y-drive block 4a.

Figure 5:
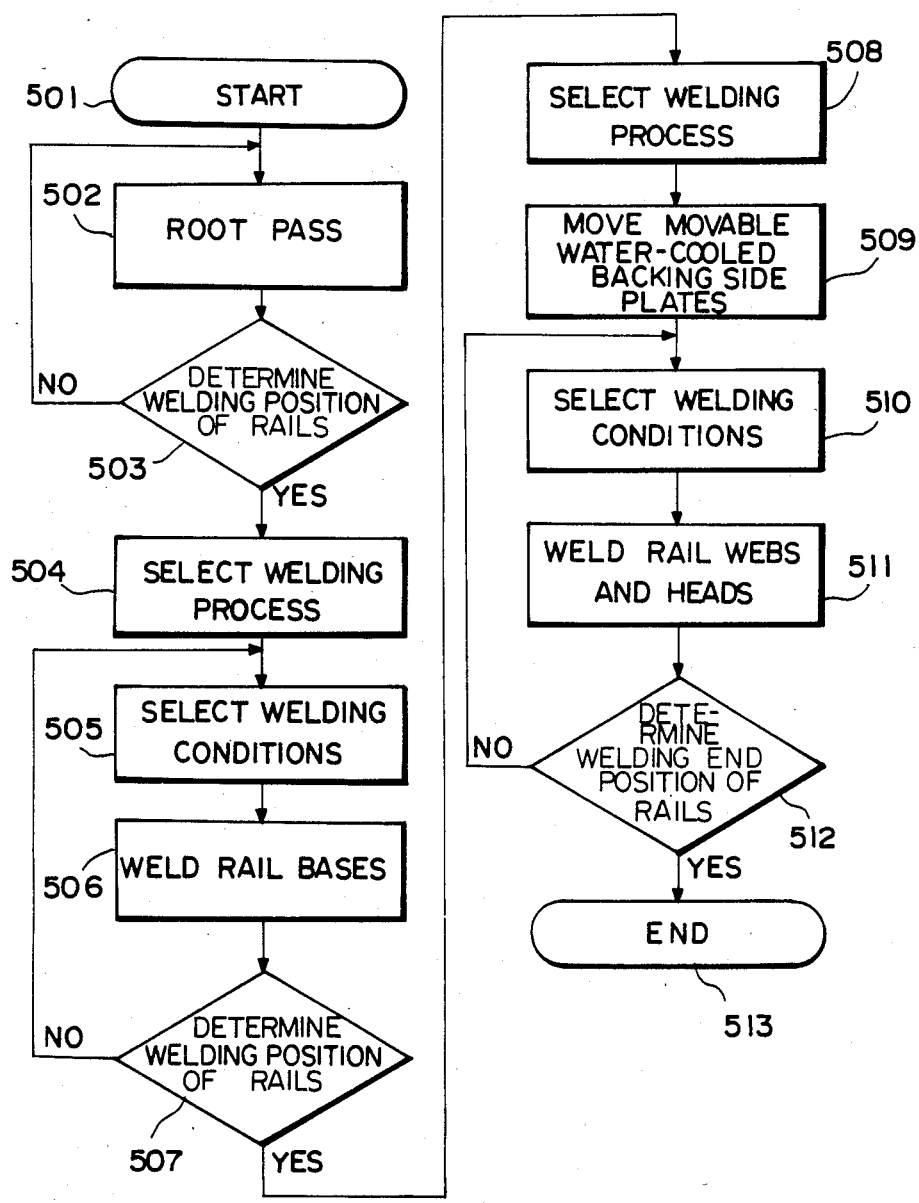
FIG. 5 is a control flow chart.
Figure 6:
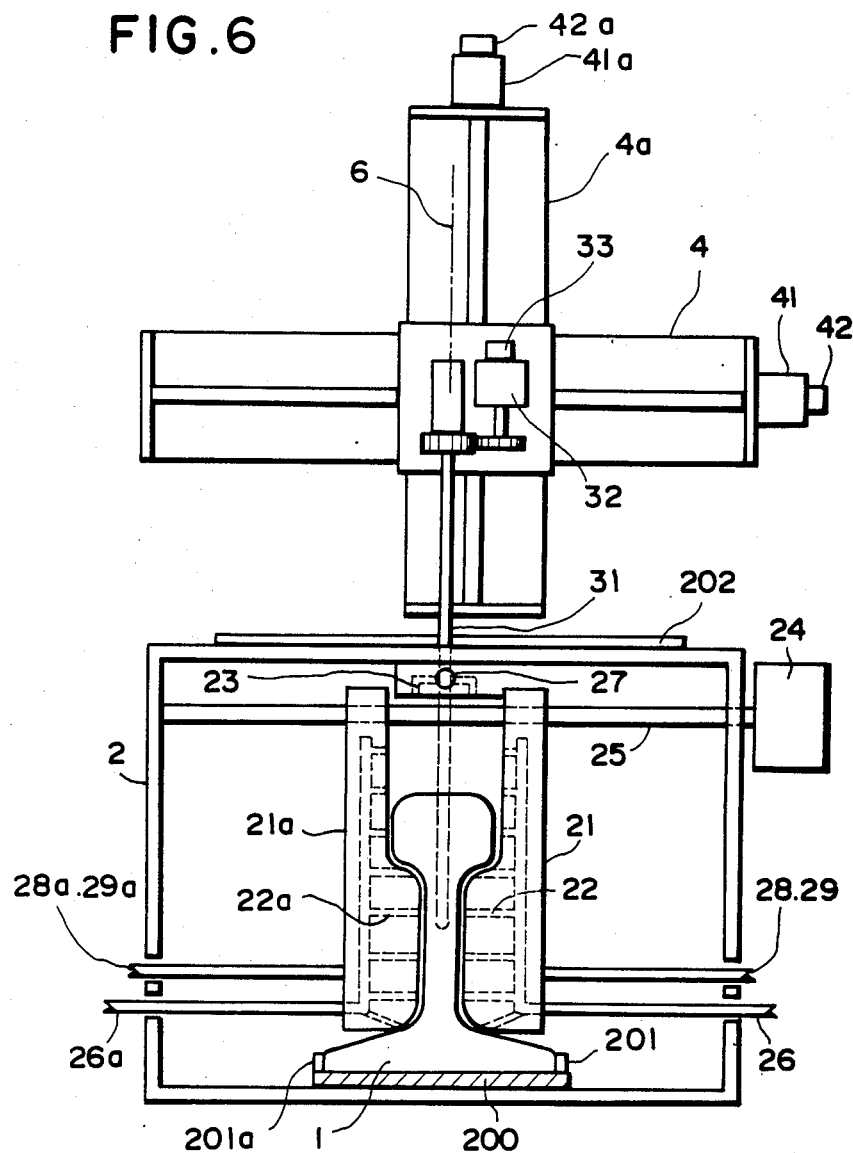
FIG. 6 is a side sectional view of the welding chamber showing the operation of the movable water-cooled side backing plates.

Next, the operation of welding the rails 1 and 1a by the above-described embodiment will be described with reference to FIGS. 3 to 6. FIG. 5 is a flow chart showing the welding operation of the rails 1 and 1a by this embodiment and FIG. 6 is a sectional view of the welding chamber 2.

The welding of the rails 1 and 1a is started at a step 501 so that a root pass is effected at a step 502 and then a specified welding area is determined by the Y-position sensor 43a forming the rail welding area detecting means 401 thus effecting the welding of the rail bases.

The welding of the rail bases is effected in a manner that the information processing unit 403 selects the multi-layer welding by the corresponding welding process or the ordinary gas-shielded arc welding stored in the memory 402 at a step 504 and also the welding conditions corresponding to the welding area and similarly stored in the memory 402 at a step 504 and these information are supplied to the drive control unit 406 at a step 506. This multi-layer welding of the rail bases is effected in the condition where the movable water-cooled side backing plates 21 and 21a are moved away from the rails 1 and 1a as shown in FIG. 3. Then, the vertical welding area of the rails is again determined at a step 507. The determination of the vertical welding area of the rails is effected in the following manner. As a result of the welding current control, the Y-drive block 4a is moved upward along with the progress of the welding and the amount of this upward movement is detected by the Y-position sensor 43a thereby detecting the height of the welding area from instant to instant.

After the upper end position of the rail bases has been detected, the welding process corresponding to the rail webs and heads is selected from the memory 402 by the information processing unit 403 at a step 508. This welding process is the electrogas arc welding. Thus, at a step 509, the movable water-cooled side backing plates 21 and 21a within the welding chamber 2 are moved so as to enclose the rail weld zone as shown in FIG. 6.

Then, the welding conditions corresponding to the welding area of the rails are selected at a step 510 and the welding of the rail webs and heads is effected, while controlling the drive means in accordance with the welding conditions corresponding to the rail welding area, at a step 511. The welding end position of the rails is determined at a step 512 and the welding of the rails is completed at a point 513.

In other words, in accordance with the predetermined program the desired values of the controlled variables, the commands for moving the movable water-cooled side backing plates 21 and 21a, the commands for opening and closing the shielding gas outlets, the gas flow rate selection commands, etc., are outputted and the welding is effected continuously from the beginning to the end fully automatically. Also, the welding voltage is controlled by applying the desired value the external terminal of the welding power source and the on-off and flow rate selection of the shielding gas are effected by providing a plurality of electromagnetic valves for the gas bomb.

While, in this embodiment, the penetration to the inner sides of the groove is ensured by the use of the method of turning the welding nozzle, any other method may be used to ensure the penetration to the inner sides of the groove.

The following Table 1 shows a comparison between the results of the tensile tests performed on the welded joints of the rails welded according to the above embodiment and the enclosed arc welding by the conventional manual welding and Table 2 shows the arc times of these welding methods.

TABLE 1

| Type of Welding | Tensile strength $Kg/mm^2$ | Break position |
|---|---|---|
| Embodiment welding | 80.6 | Bond |
| Conventional manual welding | 74.8 | Bond |

TABLE 2

| Type of Welding | Arc time |
|---|---|
| Embodiment welding | 17 min |
| Conventional manual welding | 50 min |

Figure 7:
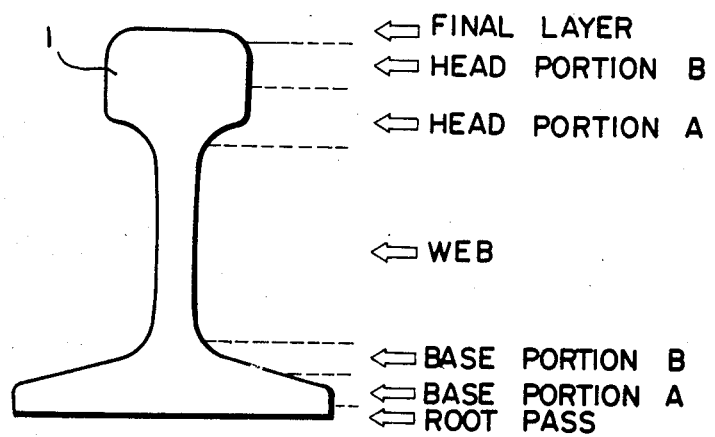
FIG. 7 is a diagram showing the welding conditions corresponding to the respective rail welding areas.

The test rails were ordinary high-carbon steel rails having a weight of 60 Kg/m and the welding conditions of the rail parts shown in FIG. 7 were as shown in the following Table 3.

TABLE 3

| Rail Welding Area | Welding voltage V | Welding current A | Welding speed cm/min |
|---|---|---|---|
| Root pass | 28 | 250 | 10–12 |
| Base portion A | 30 | 250 | 24 |
| Base portion B | 30 | 250 | 24 |
| Web | 30 | 200 | 12 |
| Head portion A | 28 | 200 | 24 |
| Head portion B | 28 | 200 | 24 |
| Final layer | 28 | 200 | 18 |

From the foregoing results it will be seen that the welding of rails according to the invention is high in quality and efficiency as compared with the conventional welding.

It is to be noted that while the welding apparatus of the present invention has been developed for rail welding purposes, the shapes of the welding chamber and the clamping mechanism and the control program may be modified so as to adapt the apparatus for the butt welding of shape steel and the like.

What is claimed is:
1. A gas-shielded arc welding apparatus comprising:
a welding apparatus proper including welding torch means having a long and narrow welding nozzle, welding wire feed means for supplying a welding wire to said welding torch means, XY drive means for moving said welding torch means in horizontal and vertical directions, and clamping means for fastening said welding apparatus proper to materials to be welded;

a welding chamber including therein shielding gas outlet means and a pair of movable water-cooled side backing members and adapted for insertion of said welding nozzle thereinto, said chamber shielding a weld zone of said materials to be welded; and control means including welding area detecting means for detecting a welding area of said materials, memory means for storing a welding process and welding conditions corresponding to each of a plurality of welding areas of said materials, information processing means responsive to and output from said welding area detecting means to select and output the corresponding welding process and welding conditions stored in said memory means, and drive control means including input means for receiving information from sensors of said XY drive means and other drive means of said apparatus proper, computing means for comparing information from said information processing means and said input means and drive output means for outputting results of said comparison to said drive means.

2. An apparatus according to claim 1, wherein said material also comprise rails whereby in accordance with rail welding area information applied to said control means, said rails are welded in such a manner that a root pass is effected by a one-side penetration bead welding, rail bases are welded by an ordinary gas-shielded arc welding, and rail webs and heads are welded by an electrogas arc welding.

3. An apparatus according to claim 2, wherein said welding nozzle of said welding torch means is formed with a hole for feeding the welding wire therethrough, said hole being eccentric at a forward end of said nozzle, and wherein said apparatus further comprises a motor for turning said nozzle, whereby a penetration to groove inner sides is ensured.

4. An apparatus according to claim 2, wherein said welding area detecting means comprises the sensor mounted on said XY drive means to detect a welding area of said rails from moment to moment whereby said control means controls welding currents, welding voltages, welding speeds, movable water-cooled side backing member positions, shielding gas flow rates and welding nozzle rotation speeds preliminarily stored in said memory means.

5. A gas-shield arc welding apparatus according to claim 1 comprising:
   a top outlet arranged above the materials to be welded; and
   a plurality of side outlets arranged on each of movable water-cooled side backing plates.

6. A gas-shield arc welding apparatus according to claim 1 wherein the side surface of each of the movable water-cooled side backing plates facing the side of the material to be welded has a contour corresponding to the form of said material to be welded.

7. A gas-shield arc welding apparatus according to claim 1 wherein a pair of the movable water-cooled side backing plates are arranged opposite to each other with the material to be welded between, each being supported movably.

8. A gas-shield arc welding apparatus according to claim 7 wherein a spirally fitted side backing plate driving shaft passes through a pair of the movable water-cooled side backing plates, this shaft being rotated rightly or reversely by a side backing plate driving motor.

9. A gas-shield arc welding apparatus according to claim 1 wherein an insulating plate having an opening through which a welding nozzle is inserted is arranged on the upper surface of the welding chamber and is supported in such a manner that it can move in compliance with the horizontal movement of the welding nozzle.

* * * * *